Jan. 12, 1965   D. B. DOOLITTLE ETAL   3,165,298
AERIAL CARGO DELIVERY SYSTEM
Filed Sept. 18, 1962

INVENTORS
Donald Beach Doolittle &
Richard Van Cortlandt Parker
BY
*Herbert M. Birch*
ATTORNEY

United States Patent Office 3,165,298
Patented Jan. 12, 1965

3,165,298
AERIAL CARGO DELIVERY SYSTEM
Donald Beach Doolittle, Hockessin, and Richard van Cortlandt Parker, Wilmington, Del., assignors to All American Engineering Company, Wilmington, Del., a corporation of Delaware
Filed Sept. 18, 1962, Ser. No. 224,368
1 Claim. (Cl. 258—1.2)

Our present invention relates to improvements in expeditionary cargo delivery and more particularly to an expeditionary kit, utilizing as a part of the kit in miniature form the arresting gear of a prior co-pending application Serial No. 177,493, filed March 5, 1962, and assigned to the assignee of the present invention, in combination with certain aircraft carried equipment of a cargo package adapted to be engaged with the components of the said land or ship based arresting gear and delivered with a minimum of transfer shock to a land station or a shipboard station on the water from a fast moving object such as, an aircraft.

Heretofore, there have been numerous cargo delivery arrangements from aircraft while in motion on the runway or in low level flight of an expeditionary nature and the present invention is an improvement of such arrangements one of which, for example, is illustrated in Patent 3,030,078, issued April 17, 1962, but wherein another type of arresting gear is used.

Thus this invention is more particularly concerned with a new type of arresting means for delivery of cargo or other objects from aircraft or other objects while in motion, said arresting means consisting of transportable ground or water based rotary hydraulic energy absorbers mounted in spaced apart relation with nylon tape wound reels or drums, said absorbers being connected by a cargo hook engageable pendant cable connected at each end to the respective spaced apart ends of the respective nylon tapes wound upon the spaced apart energy absorber reels or drums.

Other objects and advantages of this invention will become apparent in the course of the following detailed description taken in connection with the accompanying drawings, wherein:

FIGURE 1 is a top plan isometric view illustrating spaced apart ground or non-airborne installations of the energy absorbers with the reel or drum nylon purchase tapes wound thereon and the connecting pendant therebetween, plus a superimposed illustration in phantom of the airborne cargo package with its delivery equipment including the cable pendant engaging hook in approach position prior to engagement;

Figure 1:
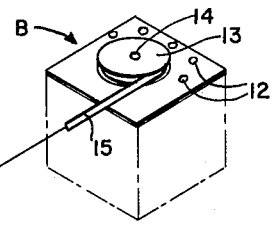
Figure 3:
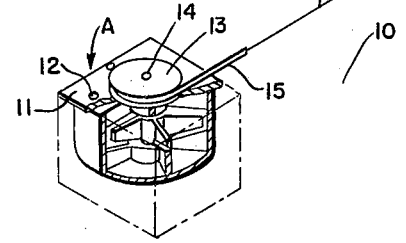
FIGURE 3 is a pictorial representation of a cargo delivery aircraft immediately on cargo hook engagement with the cable pendants.
Figure 4:
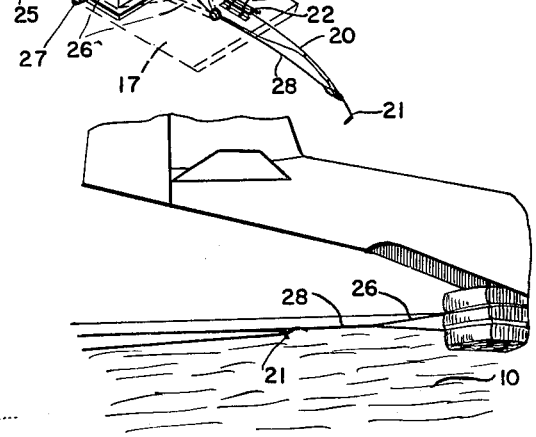
FIGURE 4 is a pictorial representation of the actual extraction of the cargo after the initial tensioning action following cargo hook engagement.
Figure 5:
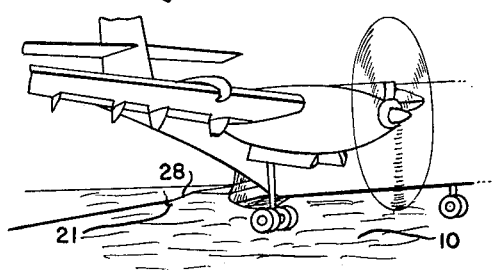
FIGURE 5 is a pictorial representation of the cargo actually being decelerated by the energy absorber means.
Figure 6:
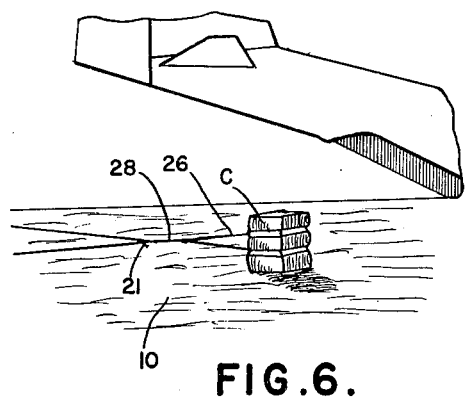
FIGURE 6 is a pictorial representation of the cargo delivered to the ground or deck base after deceleration.

Now with reference to the several figures of the drawings in detail and first with respect to FIGURE 1, there is shown a base, such as a landing surface 10 with spaced apart energy absorbers A and B mounted thereon and each being anchored by plates 11 and anchor spikes 12. The lower rotor housing with the stator vanes and the rotor member are countersunk in a pit, not shown, below the respective anchor plates 11 and only the tape reels or drums 13 are visible above the landing surface.

The tape reels 13 are keyed to the respective rotor shafts 14 of the energy absorbers and rotation of each reel caused by the payout of the nylon tape 15 wound on each reel will rotate the rotor members in the stator housing below the respective anchor plates 11 and thereby decelerate the cargo C as explained more fully hereinafter under the description of the operation.

Figure 2:
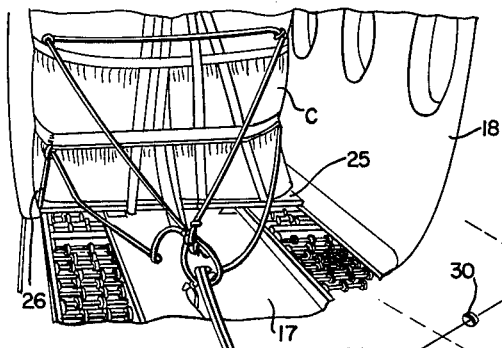
FIGURE 2 is a rear interior view of an aircraft with the cargo package therein prior to delivery.

In FIGURES 1 and 2 there is shown the loading ramp 17 of a cargo carrier aircraft 18. This ramp has the end 19 of a shank 20 of a detachable hook 21 secured thereto in a bracket 22 by suitable means, such as rivets 23. The bracket 22 is suitably secured to the loading ramp and is preferably offset with respect to the longitudinal center line of the ramp 17 out of line with the travel path of the palletized cargo package or object C to be extracted from the aircraft and delivered to the landing surface. The cargo C is preferably secured to a cargo mounting pallet 25, which rides on the ramp 17. A harness of rope or tape 26 is anchored at each end by shear pins 27 to nylon rope leader 28, which leads off from the harness 26 and connects at its free end to the hook 21. The hook disconnects from the hook arm or shank 20 as is well-known in the art, in a manner disclosed in Patent 2,692,120, when the hook engages a pendant cable 29 extending across the landing surface between the respectively spaced energy absorbers A and B, said pendant cable having each end connected to the nylon purchase tapes 15 of each absorber unit.

The pendant cable 29 may be supported slightly above the ground surface by cable supports 30, such as are claimed and illustrated in Patent 3,010,683, issued November 28, 1961, assigned to the present assignee; and upon engagement of the hook 21 with the pendant cable the sequence of the cargo delivery begins, as illustrated in FIGURES 3, 4, 5 and 6.

Briefly reviewing the operation, the hook 21 is engaged and pulled off the shank 20 as the aircraft passes over the pendant cable, for example, such speeds may be up to eighty knots. The pendant cable, when engaged by the hook, transmits the resulting loads to the respective nylon tapes 15 wound upon the reels at the top of the respective energy absorbers A and B. The tapes, in turn, apply loads to the energy absorbers A and B, thereby causing the rotors therein to rotate. As the rotors revolve, torque is created which resists tape payout from each tape reel, breaks the pallet shear pins 27, pulls the cargo C along the aircraft ramp, extracts the cargo from the rear of the aircraft and brings the palletized cargo to a stop— all within a distance of, for example, two hundred feet (200).

Thus, there is provided an aerial cargo delivery kit for tail loading aircraft such as the Caribou and the C-130, whereby fast accurate delivery of palletized cargo weighing, for example, up to five thousand pounds (5,000 lbs.) is efficiently performed without the use of expensive prior systems, such as parachute systems or the long turn around times of terminal off-loading techniques.

Also, efficient and rapid installation time for the miniature units is proven in practice to be approximately fifteen minutes with a five man crew and reset of these units is manually performed by the five man crew in approximately two minutes. Furthermore, the complete combination is of relatively light weight compared to most prior systems and is completely transportable for rapid installation at any selected locations.

Without further description it is believed that the present invention is clearly understandable to others authorized to practice the same and while only one embodiment is described and illustrated in detail, it is to be expressly understood that other combinations, modifications and arrangements of the parts which will now probably occur to others skilled in the art are to be considered a part hereof. To determine the scope of the present invention, reference should be had to the appended claim.

What I claim is:

Means for extraction and ground delivery of cargo or the like from a moving aircraft, comprising a hook on said cargo movable therewith and said hook being engageable with a pendant cable, connected to ground based spaced apart hydraulic energy absorbers each having a liquid filled housing and a rotor therein, each of said energy absorbers having a rotor supported reel exterior of each respective housing, said reels each having nylon tapes stored thereon, each tape being wound in a single coil on their respective reels with an extended free end of each tape in oppositely spaced relation, said free end of each spaced tape connecting to an opposite end of the cable pendant extending between said energy absorbers, means for holding said cable elevated above the ground, a cargo ramp having an inboard and an outboard end carried by said aircraft, a bracket secured to said ramp, a shank having the free end thereof extending from said bracket beyond the outboard end of said ramp, a slidably detachable hook mounted on the free end of said shank, a cable connecting said hook to the said cargo on said ramp, said cargo hook when engaging with said cable pendant pulling on said tapes on each reel thereby imparting rotation to said reels and rotation to said rotor of each of said energy absorbers, thereby setting up an energy absorbing force, said energy absorbing force increasing as said respective tapes payout from their respective reels, whereby said cargo upon said cargo hook engagement with said cable pendant is extracted from the outboard end of the ramp of the rear of said aircraft and decelerated to a stop on the ground by said energy absorber units.

References Cited by the Examiner

UNITED STATES PATENTS

| | | | |
|---|---|---|---|
| 1,992,911 | 2/35 | De La Mater. | |
| 2,692,120 | 10/54 | Colton et al. | 244—110 X |
| 2,967,683 | 1/61 | Crater | 244—110 |
| 2,994,496 | 8/61 | Flomenhoft | 244—110 |
| 3,010,683 | 11/61 | Cotton | 244—110 |
| 3,017,163 | 1/62 | Van Zelm et al. | 258—1.2 |
| 3,093,352 | 6/63 | Hoffstrom | 244—110 |

LOUIS J. DEMBO, *Primary Examiner.*